US010390334B2

(12) United States Patent
Gerstenberger et al.

(10) Patent No.: US 10,390,334 B2
(45) **Date of Patent: *Aug. 20, 2019**

(54) METHODS AND ARRANGEMENTS IN A WIRELESS COMMUNICATIONS SYSTEM

(71) Applicant: Optis Wireless Technology, LLC, Plano, TX (US)

(72) Inventors: Dirk Gerstenberger, Stockholm (SE); Johan Bergman, Stockholm (SE)

(73) Assignee: Optis Wireless Technology, LLC, Plano, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/406,991

(22) Filed: Jan. 16, 2017

(65) Prior Publication Data

US 2017/0127406 A1 May 4, 2017

Related U.S. Application Data

(63) Continuation of application No. 14/257,479, filed on Apr. 21, 2014, now Pat. No. 9,585,128, which is a (Continued)

(51) Int. Cl.
*H04W 72/04* (2009.01)
*H04W 74/08* (2009.01)
(Continued)

(52) U.S. Cl.
CPC ..... *H04W 72/0413* (2013.01); *H04W 56/003* (2013.01); *H04W 74/0833* (2013.01);
(Continued)

(58) Field of Classification Search
CPC ......... H04W 72/0413; H04W 74/0833; H04W 56/003; H04W 48/08; H04W 74/006; H04W 74/08
See application file for complete search history.

(56) References Cited

U.S. PATENT DOCUMENTS 8,705,434 B2 * 4/2014 Gerstenberger .... H04W 56/003 370/322
2001/0018342 A1 * 8/2001 Vialen .................. H04W 76/19 455/423
(Continued)

FOREIGN PATENT DOCUMENTS

EP 1841088 A1 10/2007
GB 2431828 A 5/2007
(Continued)

OTHER PUBLICATIONS

International Search Report, International application No. PCT/SE2008/051470, dated Jan. 25, 2010, 4 pgs.
(Continued)

*Primary Examiner* — Christopher P Grey
(74) *Attorney, Agent, or Firm* — Nixon & Vanderhye P.C.

(57) ABSTRACT

The present invention relates to methods and arrangements that make it possible to control the delay for the UEs to access the EUL resources in the Enhanced Uplink in CELL_FACH state procedure, independently from the delay for the UEs to access ordinary UL resources in the RACH procedure. This is achieved by a solution where the timing of entering (or re-entering) a transmission procedure for Enhanced Uplink in CELL_FACH state is controlled with the help of a transmission control parameter defined specifically for this transmission procedure, instead of using the same parameter as for the RACH procedure.

17 Claims, 6 Drawing Sheets

Related U.S. Application Data continuation of application No. 12/865,867, filed as application No. PCT/SE2008/024170 on Dec. 16, 2008, now Pat. No. 8,705,434.

(60) Provisional application No. 61/025,900, filed on Feb. 4, 2008.

(51) Int. Cl.

| | |
|---|---|
| ***H04W 74/00*** | (2009.01) |
| ***H04W 56/00*** | (2009.01) |
| ***H04W 48/08*** | (2009.01) |

(52) U.S. Cl.

CPC .......... *H04W 48/08* (2013.01); *H04W 74/006* (2013.01); *H04W 74/08* (2013.01)

(56) References Cited

U.S. PATENT DOCUMENTS

| | | | | | |
|---|---|---|---|---|---|
| 2004/0177154 | A1* | 9/2004 | Sarkkinen | H04L 12/185 | 709/236 |
| 2004/0219919 | A1* | 11/2004 | Whinnett | H04W 72/1278 | 455/442 |
| 2004/0264497 | A1 | 12/2004 | Wang et al. | | |
| 2007/0064665 | A1* | 3/2007 | Zhang | H04L 5/006 | 370/343 |
| 2008/0004050 | A1* | 1/2008 | Bi | H04W 74/006 | 455/466 |
| 2008/0205433 | A1* | 8/2008 | Pihlaja | H04W 74/004 | 370/461 |
| 2008/0253323 | A1* | 10/2008 | Fischer | H04W 74/0866 | 370/329 |
| 2009/0181710 | A1* | 7/2009 | Pani | H04W 88/02 | 455/509 |
| 2010/0191965 | A1* | 7/2010 | Fischer | H04L 63/123 | 713/168 |

FOREIGN PATENT DOCUMENTS

| | | | |
|---|---|---|---|
| GB | 2431838 | A | 5/2007 |
| WO | 2004064272 | A1 | 7/2004 |
| WO | 2004100598 | A1 | 11/2004 |
| WO | 2007052900 | A1 | 5/2007 |
| WO | 2009099372 | A2 | 8/2009 |

OTHER PUBLICATIONS

International Search Report, International application No. PCT/SE2008/051470, dated Sep. 22, 2009, 4 pgs.

Written Opinion of the International Searching Authority, International application No. PCT/SE2008/051470.

* cited by examiner

METHODS AND ARRANGEMENTS IN A WIRELESS COMMUNICATIONS SYSTEM

CROSS-REFERENCE TO RELATED APPLICATIONS

This application is a Continuation of U.S. patent application Ser. No. 14/257,479 filed on Apr. 21, 2014, which claims priority from U.S. patent application Ser. No. 12/865,867 filed on Aug. 3, 2010, which was issued on Apr. 22, 2014 as U.S. Pat. No. 8,705,434, which claims priority from International Patent Application No. PCT/SE2008/051470, filed Dec. 16, 2008, which claims priority from U.S. Provisional Patent Application No. 61/025,900 filed Feb. 4, 2008, which are all incorporated herein by reference in their entirety.

TECHNICAL FIELD

The present invention relates to methods and arrangements in a wireless communications system, in particular to methods and arrangements for controlling the timing of a user equipment entering an uplink transmission procedure.

BACKGROUND

The Universal Mobile Telecommunication System (UMTS), also referred to as the third generation (3G) system or the wideband code division multiplexing access (WCDMA) system, is designed to succeed GSM. UMTS Terrestrial Radio Access Network (UTRAN) is the radio access network of a UMTS system.

High-Speed Downlink Packet Access (HSPDA) is an evolution of UTRAN bringing further enhancements to the provisioning of packet-data services both in terms of system and end-user performance. The downlink packet-data enhancements of HSDPA are complemented with Enhanced Uplink (EUL), also known as High-Speed Uplink Packet Access (HSUPA). EUL provides improvements in the uplink capabilities and performance in terms of higher data rates, reduced latency, and improved system capacity, and is therefore a natural complement to HSDPA. HSDPA and EUL are often jointly referred to as High-Speed Packet Access (HSPA).

FIG. 1 illustrates a wireless communications system, such as a HSPA system, including a radio access network such as the UTRAN. The UTRAN architecture comprises at least one radio base station (NodeB) 130, connected to one or more Radio Network Controllers (RNC) 100. The UTRAN is connected over an interface to a Core Network (CN) 120. The UTRAN and the CN 120 provide communication and control for a plurality of user equipments (UE) 150. The UEs 150 are wirelessly connected to at least one NodeB 130, and they communicate with each other over downlink and uplink channels.

In a UTRAN, the dedicated transport channel is called Dedicate Channel (DCH). The DCH carries all the information to/from a specific UE from/to higher layers including the data for the actual service and higher layer control information. In a UTRAN with HSPA, the HSPA enhancements are implemented through new dedicated transport channels: the High-Speed Downlink Shared Channel (HS-DSCH) for HSDPA and the Enhanced Dedicated Channel (E-DCH) for EUL.

Packet-data is often transmitted in bursts, which gives occasional periods of transmission activity and no transmission activity in between these periods. From a user performance perspective, it is advantageous to keep the HS-DSCH and E-DCH configured to rapidly be able to transmit any user data. At the same time, maintaining the connection in uplink and downlink comes at a cost. From a network perspective, there is a cost in uplink interference from the control data transmission even in absence of data transmission. From a UE perspective, power consumption is the main concern; even when no data is received the UE needs to transmit and monitor control data. To reduce UE power consumption, UMTS/WCDMA has several connected mode states which define what kind of physical channels a UE is using: Cell_DCH 220, Cell_FACH 210, and Cell_PCH/URA_PCH 200, schematically illustrated in FIG. 2, with arrows defining the possible state changes.

The lowest power consumption is achieved when the UE is in one of the two paging states Cell_PCH/URA_PCH 200. For exchange of data, the UE needs to be moved to the Cell_FACH 210 or Cell_DCH 220 state. The high transmission activity state is known as CELL_DCH 220. In this state, a dedicated physical channel is allocated to the UE and the UE can use e.g. HS-DSCH and E-DCH for exchanging data with the network. This state allows for rapid transmission of large amounts of user data, but also has the highest UE power consumption. In order to avoid a waste of UE battery, the UE is switched to CELL_FACH 210 state if there hasn't been any transmission activity for a certain period of time. In Cell_FACH 210 state, the UE can transmit small amounts of packet data as part of the random access procedure on the Random Access Channel (RACH). The UE also monitors common downlink channels (Forward Access Channel (FACH)) for small amounts of user data and Radio Resource Control (RRC) signalling from the network.

The RACH is an uplink transport channel intended to be used to carry control information from the UE, such as requests to set up a connection. RACH is mapped on the Physical Random Access Channel (PRACH). As stated above, the RACH procedure can also be used to send small amounts of packet data from the UE to the network in the Cell_FACH state.

The following paragraphs outlines the Layer 2 (L2) Medium Access Control (MAC) description for controlling the transmissions in the RACH procedure, as described in the 3GPP ($3^{rd}$ Generation Partnership Project) technical specification TS 25.321. The RACH transmissions are controlled by the UE MAC sublayer, hereinafter referred to as UE (MAC). The UE (MAC) receives the following RACH transmission control parameters from the Radio Resource Control (RRC):

- a set of Access Service Class (ASC) parameters, which includes for each ASC, i=0, . . . ,NumASC an identification of a PRACH partition and a persistence value Pi (transmission probability);
- maximum number of preamble ramping cycles Mmax;
- range of back-off interval for timer TBO1, given in terms of numbers of transmission time (10 ms) intervals NBO1 max and NBO1 min.

When there is data to be transmitted, the UE (MAC) selects the ASC from the available set of ASCs, which consists of an identifier i of a certain PRACH partition and an associated persistence value Pi. Based on the persistence value Pi (used in a persistency test), the UE decides whether to enter the Layer 1 (L1) PRACH transmission procedure in the present transmission time interval (TTI) or not. If transmission is not allowed, a new persistency test is performed in the next TTI, and the persistency test is repeated until transmission is allowed. When transmission is allowed, the PRACH transmission procedure—starting with a preamble power ramping cycle—is entered. The UE (MAC) then waits for access information from L1.

When the preamble has been acknowledged on the Acquisition Indicator Channel (AICH), L1 access information with parameter value "ready for data transmission" is indicated to the UE (MAC). The data transmission is then requested, and the PRACH transmission procedure is completed with transmission of the PRACH message part according to L1 specifications. When no acknowledgement on AICH is received while the maximum number of preamble retransmissions is reached, a new persistency test is performed in the next TTI. The timer T2 ensures that two successive persistency tests are separated by at least one 10 ms time interval.

If a negative acknowledgement is received on AICH, a back-off timer TBO1 is started. After expiry of the timer, a persistency test is performed again. Back-off timer TBO1 is set to an integer number NBO1 of 10 ms time intervals, randomly drawn within an interval 0≤NBO1 min≤NBO1≤NBO1 max (with uniform distribution). NBO1 min and NBO1 max may be set equal when a fixed delay is desired, and even to zero when no delay other than the one due to the persistency test is desired.

Before a persistency test is performed it shall be checked whether any new RACH transmission control parameters have been received from RRC, and the latest set of RACH transmission control parameters shall be applied. If the maximum number of preamble ramping cycles Mmax is exceeded, failure of RACH transmission shall be reported to higher layer.

The RACH procedure has to cope with the near-far problem, as there is no exact knowledge of the required transmission power when entering the transmission procedure. As indicated above, this is solved with a preamble transmission procedure with power ramping. In the following, a summary of the different UE steps of a RACH procedure will be described with reference to FIG. 3*a*.

The UE decodes the broadcast channel 301 to find out the available RACH sub-channels and their scrambling codes and signatures, as well as the transmission control parameters (see above). Based on the persistence value Pi, the UE decides whether to enter the transmission procedure in the present TTI or not. This so called persistency test 302 is explained with more details below. If the persistency test allows transmission 303/YES, the UE selects randomly one of the RACH sub-channels. If the persistency test does not allow transmission 303/NO, the UE needs to wait for the next TTI before a new persistency test 302 is performed. This is repeated until transmission is allowed.

The downlink power level is measured and the initial RACH power level is set 304 based on this measurement (according to the open loop power control). A first preamble is transmitted 305. The UE decodes the Acquisition Indicator Channel (AICH) 306 to see whether the NodeB has detected the preamble. In case no AICH is detected 306/NO, the UE increases the preamble transmission power 304 by a step given by the NodeB. The preamble is retransmitted 305 in the next available access slot. If the maximum number of preambles has been reached, a new persistency test 302 is performed.

When an acknowledgement (ACK) from the NodeB is detected on AICH 306/ACK, the UE transmits the message part of the RACH transmission 307. In the case of a blocking situation (e.g. two UEs requesting a connection at the same time) the NodeB will transmit a NACK on the AICH 306/NACK to one of the UEs. This will force the UE to exit the RACH procedure and re-enter it after a certain delay controlled by the timer TBO1 308. After expiry of the timer, a new persistency test 302 is performed to check if the UE is allowed to re-enter the procedure.

During the persistency test 302, referred to above, the UE generates a random value between 0 and 1 and checks whether this value is within the interval given by the persistency value Pi. A UE generating a random value below a threshold defined by the persistency value Pi, will be allowed to start the RACH procedure. By configuring the persistency value parameter, the probability of a UE entering the preamble transmission procedure can be controlled. As an example, if the persistency value is set to 0.9, there is a 90% probability that the UE will initiate the RACH procedure, which means that the delay is typically rather short, while with a persistency value of 0.1, there is only a 10% chance of the UE initiating the procedure, thus typically giving a longer delay.

The network steps in the RACH procedure are described below with reference to FIG. 3*b*. The RNC configures the transmission control parameters and transmits them via layer3 signalling. The NodeB broadcasts the available RACH sub-channels and their scrambling codes and signatures, as well as the transmission control parameters 311. When the UE has reached the needed preamble transmission power level, the NodeB will receive the preamble 312. NodeB will then check for available resources 313, and will transmit an ACK and the resource allocation 314 when resources are available 313/YES. After having received the message part of the RACH transmission 315, the resources will be released by the NodeB 316. If the resource availability check is negative 313/NO, a NACK will be transmitted on the AICH instead.

In the 3GPP, the transmission procedure in the Enhanced Uplink in CELL_FACH state has been discussed, and it has been agreed to use a preamble transmission procedure with power ramping with the same transmission control parameters as in the ordinary RACH procedure (as described above), and to use a specific AICH or EUL AICH (E-AICH) sequences indicating EUL resources to the UE. This procedure will hereinafter be referred to as Enhanced Uplink in CELL_FACH state procedure.

A disadvantage of this solution, is that the delay for the UEs to access the EUL resources in the Enhanced Uplink in CELL_FACH state procedure, is the same as the delay for the UEs to access ordinary UL resources in the RACH procedure. Since both procedures serve quite different purposes, an equal delay will give sub-optimal performance of the Enhanced Uplink in CELL_FACH state procedure. Solutions for a reduced delay for the Enhanced Uplink in CELL_FACH state procedure has been discussed in 3GPP, and it has been proposed to re-enter the preamble transmission with the power level of the latest preamble transmission before NACK, alternatively with the power level minus a small power back-off of the latest preamble transmission before NACK.

SUMMARY

The object of the present invention is to provide methods and arrangements that obviate the above described disadvantage and that make it possible to reduce the delay for the UEs to access the EUL resources in the Enhanced Uplink in CELL_FACH state procedure.

This is achieved by a solution where the timing for entering (or re-entering) the transmission procedure in Enhanced Uplink in CELL_FACH state is controlled with the help of a set of transmission control parameters defined specifically for this transmission procedure. The UE thus selects transmission control parameters dependent on the type of transmission procedure, when entering the transmission procedure.

Thus in accordance with a first aspect of the present invention, a method in a radio network controller of a wireless communication network, for supporting a UE entering a transmission procedure is provided. The radio network controller communicates with at least one UE via layer 3 signalling. The type of transmission procedure is a RACH procedure or an enhanced uplink in CELL_FACH state procedure. In the method a first set of transmission control parameters are configured, which are associated with timing for a UE entering a RACH procedure. Furthermore a second set of transmission control parameters are configured, which are associated with timing for a UE entering an enhanced uplink in CELL_FACH state procedure. The timing for entering the transmission procedure for the UE is controlled depending on the type of transmission procedure, by transmitting at least the second set of transmission control parameters to the at least one UE.

In accordance with a second aspect of the present invention, a method in a UE of a wireless communication network, for entering a transmission procedure is provided. The type of transmission procedure is a RACH procedure or an enhanced uplink in CELL_FACH state procedure. In the method at least a second set of transmission control parameters are received via layer 3 signalling, where this second set of parameters is associated with timing for entering an enhanced uplink in CELL_FACH state procedure. Furthermore, the timing for entering the transmission procedure using the second set of transmission control parameters is derived, when initiating an enhanced uplink in CELL_FACH state procedure, and the timing for entering the transmission procedure using a first set of transmission control parameters associated with timing for entering a RACH procedure is derived, when initiating a RACH procedure. In the method the transmission procedure is entered, depending on the type of transmission procedure, according to the derived timing.

In accordance with a third aspect of the present invention a radio network controller of a wireless communication network is provided. The radio network controller is configured to communicate with at least one UE via layer 3 signalling and is capable to support the UE entering a transmission procedure. The type of transmission procedure is a RACH procedure or an enhanced uplink in CELL_FACH state procedure. The radio network controller comprises means for configuring a first set of transmission control parameters associated with timing for a UE entering a RACH procedure. Furthermore, it comprises means for configuring a second set of transmission control parameters associated with timing for a UE entering an enhanced uplink in CELL_FACH state procedure. It also comprises a controlling unit for controlling the timing for entering the transmission procedure for the at least one UE depending on the type of transmission procedure. The controlling unit is further configured to transmit at least the second set of transmission control parameters to the at least one UE for controlling the timing.

In accordance with a fourth aspect of the present invention, a UE of a wireless communication network is provided, capable of entering a transmission procedure. The type of transmission procedure is a RACH procedure or an enhanced uplink in CELL_FACH state procedure. The UE is characterised by means for receiving at least a second set of transmission control parameters via layer 3 signalling, where this second set of parameters is associated with timing for entering an enhanced uplink in CELL_FACH state procedure, and means for deriving the timing for entering the transmission procedure using the second set of transmission control parameters, when initiating an enhanced uplink in CELL_FACH state procedure. The UE further comprises means for deriving the timing for entering the transmission procedure using a first set of transmission control parameters associated with timing for entering a RACH procedure, when initiating a RACH procedure. It also comprises means for entering the transmission procedure, depending on the type of transmission procedure, according to the derived timing.

An advantage of embodiments of the present invention is that the time delay before entering the transmission procedure for Enhanced Uplink in CELL_FACH state, and the time delay between exiting the procedure (when receiving a NACK) and re-entering it, can be reduced compared to the corresponding delays for the RACH procedure. Thus, the time it takes to access EUL resources in the transmission procedure may always be optimized for the Enhanced Uplink in CELL_FACH state purpose, regardless of what is needed for the RACH procedure.

DETAILED DESCRIPTION

Figure 1:
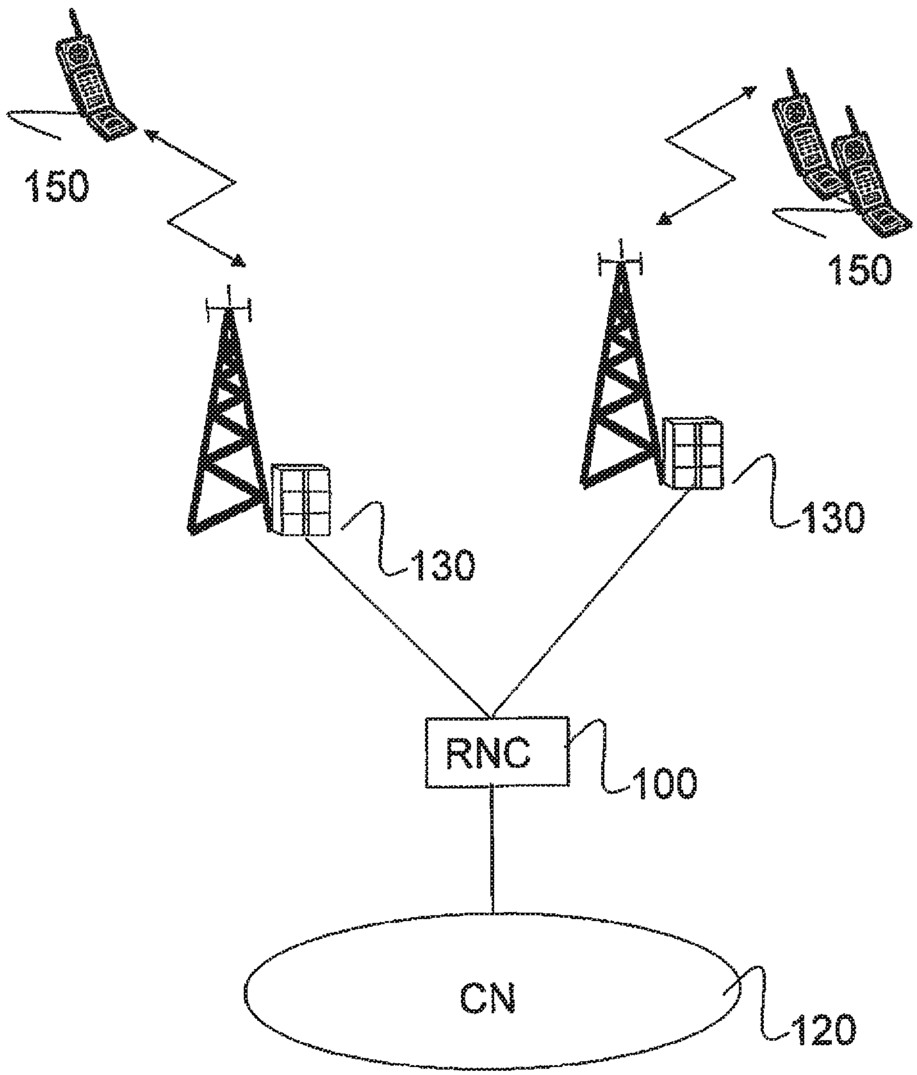
FIG. 1 illustrates schematically a part of a UTRAN wherein the present invention may be implemented.
Figure 2:
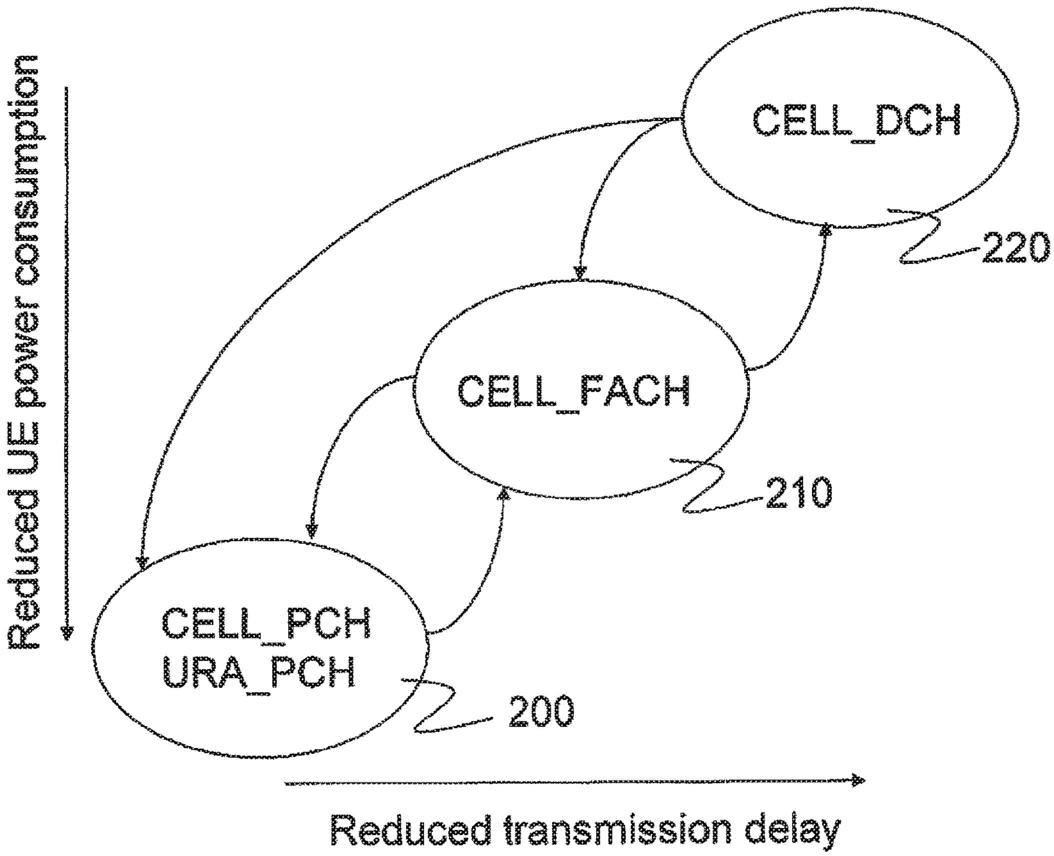
FIG. 2 illustrates schematically the different connected mode states of a UE in UMTS/WCDMA.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a HSPA wireless communications system. It should though be noted that the invention and its exemplary embodiments may also be applied to other types of wireless communications system with similar characteristics to HSPA, in terms of transmission procedures.

As mentioned above, it has been discussed how to reduce the delay for the UEs to access the EUL resources again after a NACK in the Enhanced Uplink in CELL_FACH state procedure. It has for example been proposed to re-enter the preamble transmission with the power level of the latest preamble transmission before NACK, alternatively with the power level minus a small power back-off of the latest preamble transmission before NACK. However, the actual total delay for a UE, counting from exiting the Enhanced Uplink in CELL_FACH state procedure to the point where a preamble is successfully received at the NodeB, includes not only the time for sending preambles during the power ramping phase. It also includes the time consumed before the preamble transmission procedure is actually entered and the first preamble is transmitted.

The timing of the first preamble transmission—both when entering and re-entering the procedure—is controlled by different transmission control parameters. These parameters are configured by the RNC and informed to the UE through the NodeB via Layer3 signalling. One such parameter is the persistence value parameter which is used in the persistency test, thus affecting the timing of entering and re-entering the procedure, as described above for the RACH procedure. Another parameter is the back-off time parameter which defines the range of the back-off interval. This range is used when determining what the back-off timer TBO1 is set to, as described above. The timer TBO1 affects the timing of re-entering the procedure after a NACK.

The basic idea with the present invention is to use specifically defined values for the above mentioned transmission control parameters for the Enhanced Uplink in CELL_FACH state procedure, in order to reduce the delay for the UEs to access the EUL resources in this procedure. The transmission control parameters used for the RACH procedure are not adapted for the Enhanced Uplink in CELL_FACH state procedure, so separate parameters are needed to optimize the Enhanced Uplink in CELL_FACH state procedure for its purpose. In embodiments of the present invention, the RNC thus configures separate Enhanced Uplink in CELL_FACH state procedure parameters. The parameters are broadcasted to all UEs, or transmitted to dedicated UEs.

According to an example of the present invention, the RNC configures a first set of (i.e. one or more) transmission control parameters to be used for the RACH procedures, but also a separate second set of (i.e. one or more) transmission control parameters to be used for Enhanced Uplink in CELL_FACH state procedure, in order to control the timing of entering and re-entering the RACH procedure and the Enhanced Uplink in CELL_FACH state procedure separately. Either only the second set of parameters, or both the first and the second set of parameters, are signaled with Radio Resource Control (RRC) signalling transparently via the NodeB to the UE. As mentioned above, the parameters may be broadcasted to all UEs.

In a first embodiment of the present invention, the second set of transmission control parameters comprises the persistence value parameter only. In this embodiment there will thus be a separate persistence value $P_{i,ENHANCED\ UPLINK\ IN\ CELL\ FACH\ STATE}$ to be used for controlling the timing of entering or re-entering the Enhanced Uplink in CELL_FACH state procedure. By setting a higher persistence value, the UE will faster enter or re-enter the Enhanced Uplink in CELL_FACH state procedure, as the probability for the UEs to randomly generate a value below the persistency value is increased (as explained above).

In a second embodiment, the second set of transmission control parameters comprises the back-off time parameter only. In this embodiment there will thus be a separate back-off time parameter, comprising a minimum and a maximum value (NBO1 min and NBO1 max) defining the range of the NBO1 interval, used when setting the back-off timer TBO1 for the Enhanced Uplink in CELL__ FACH state procedure (as described above). By setting the NBO1 min and NBO1 max values to zero e.g., the UE will faster perform a new persistency test when re-entering the procedure, as the timer TBO1 will always be set to zero.

In a third embodiment, the second set of transmission control parameters comprises both the persistence value parameter and the back-off time parameter. This is thus a combination of the first and the second embodiment described above, making it possible to control the timing of entering the procedure both by e.g. using a higher persistency value and by using an adapted back-off time parameter.

Figure 4A:
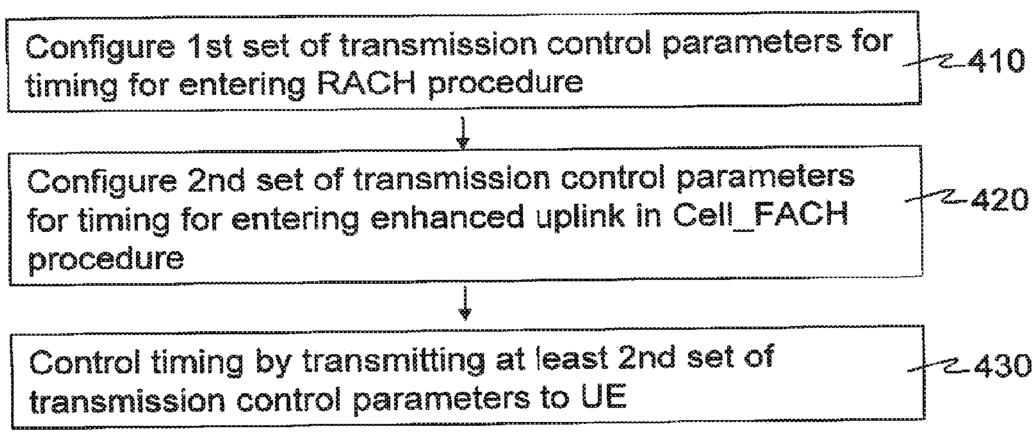
FIGS. 4*a* and 4*b* are flowcharts of the methods of the RNC and UE respectively according to embodiments of the present invention.

FIG. 4*a* is a flowchart of the method for the RNC, according to an embodiment of the present invention. In step 410, the RNC configures a first set of transmission control parameters associated with timing for a UE entering a RACH procedure. This first set of parameters could comprise the persistence value parameter or the back-off time parameter or both. Furthermore, the RNC configures 420 a separate second set of transmission control parameters associated with timing for a UE entering an enhanced uplink in CELL_FACH state procedure. This second set of parameters could also comprise the persistence value parameter or the back-off time parameter or both (see description of first, second and third embodiment above), and it does not need to comprise the same set of parameters as in the first set. The RNC then controls 430 the timing for entering the transmission procedure for the UE depending on the type of transmission procedure, by transmitting at least the second set of transmission control parameters to the UE. The timing of the transmission in the Enhanced Uplink in CELL_FACH state procedure is controlled based on the parameters of the second set, independently of the timing of the transmission in the RACH procedure.

Figure 3A:
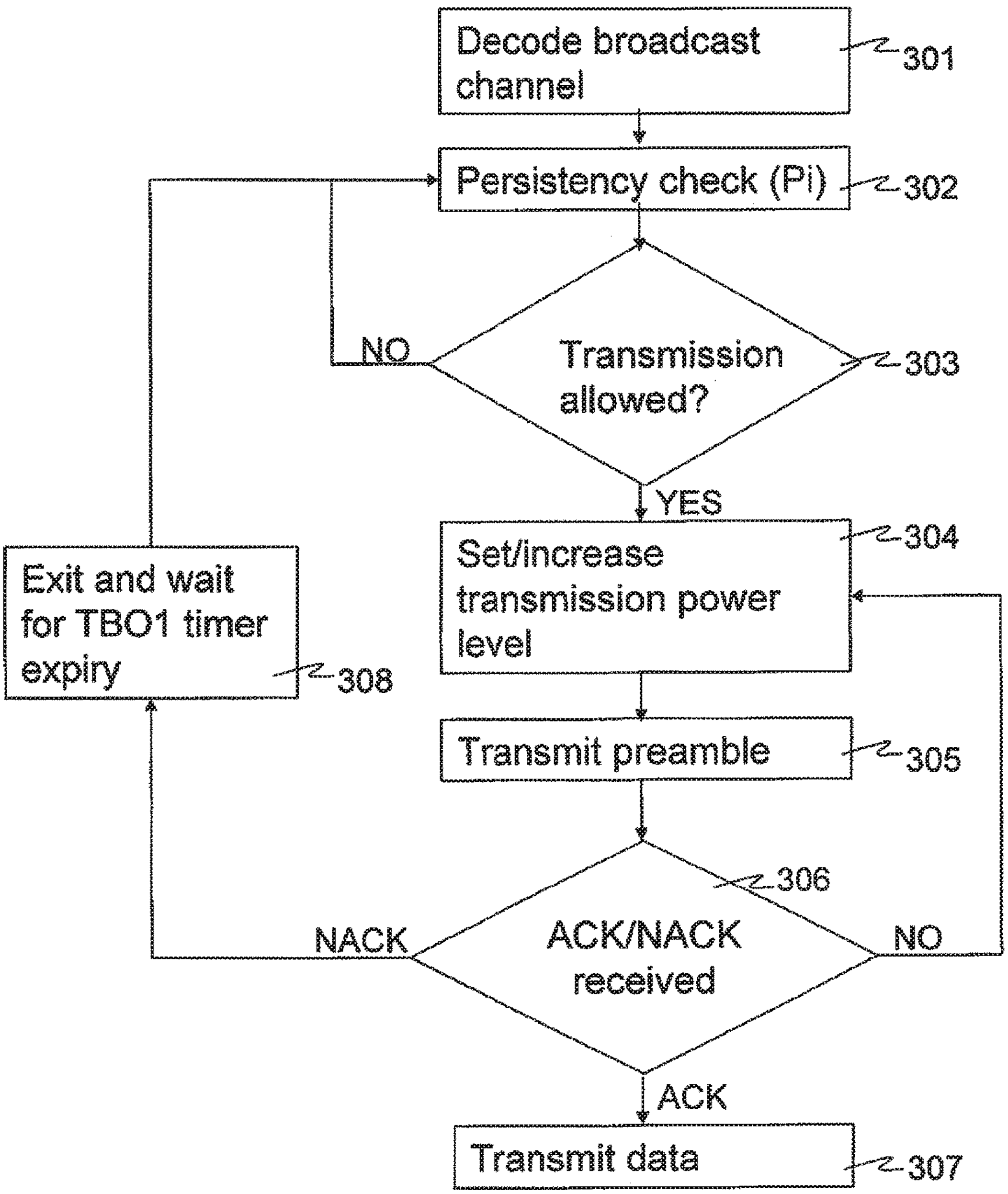
FIGS. 3*a* and 3*b* are flowcharts of the UE steps and the network steps in a RACH procedure respectively, according to prior art.
Figure 3B:
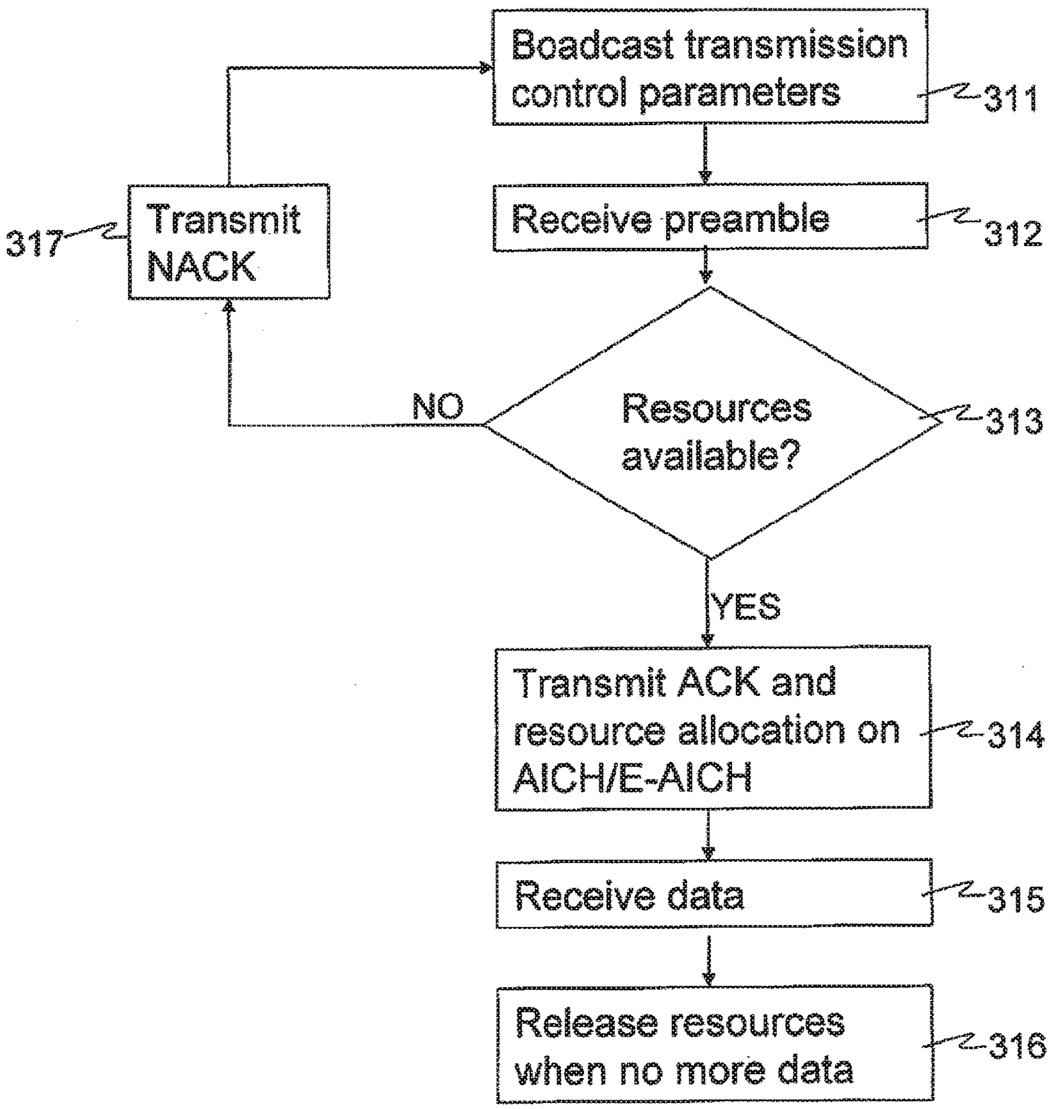
Figure 4B:
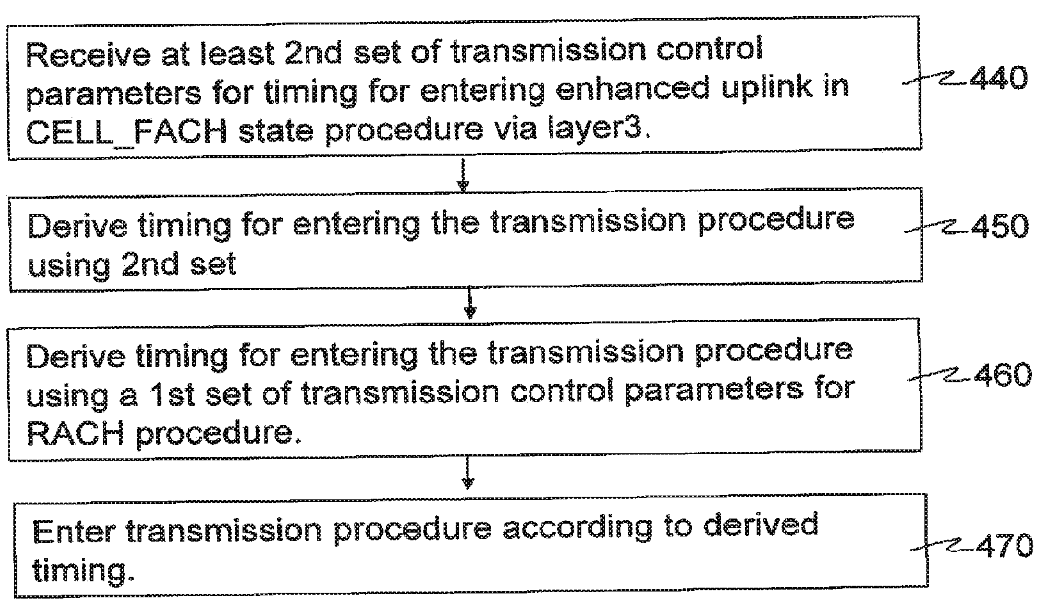

Furthermore, FIG. 4*b* is a flowchart of the method for the UE, according to an embodiment of the present invention. In step 440, the UE receives at least a second set of transmission control parameters associated with timing for entering an enhanced uplink in CELL_FACH state procedure, via layer3 signalling (RRC) from the RNC. When initiating an enhanced uplink in CELL_FACH state procedure, the UE will derive 450 the timing for entering the transmission procedure using this second set of transmission control parameters. If this second set comprises a persistence value parameter, then the UE will use this parameter in the persistency test that precedes the preamble transmission procedure to find out when to enter the transmission procedure (delay due to the persistency test, corresponding to the step 302, 303 in FIG. 3*a*). If the second set also comprises a back-off time parameter, then the UE will use this parameter for setting the TBO1 timer and thus to find out when to re-enter the enhanced uplink in CELL_FACH state procedure (delay due to TBO1 timer expiry and persistency test corresponding to step 308 and 302, 303 in FIG. 3*a*). When initiating a RACH procedure, the UE will derive 460 the timing for entering the transmission procedure using a first set of transmission control parameters associated with timing for entering a RACH procedure instead. Finally, the UE will also actually enter 470 the relevant transmission procedure according to the timing that has been derived. With e.g. a higher persistency value for the enhanced uplink in Cell-FACH state procedure than for the RACH procedure, the UE will thus typically faster access the enhanced uplink resources than the ordinary dedicated channel resources.

Figure 5:
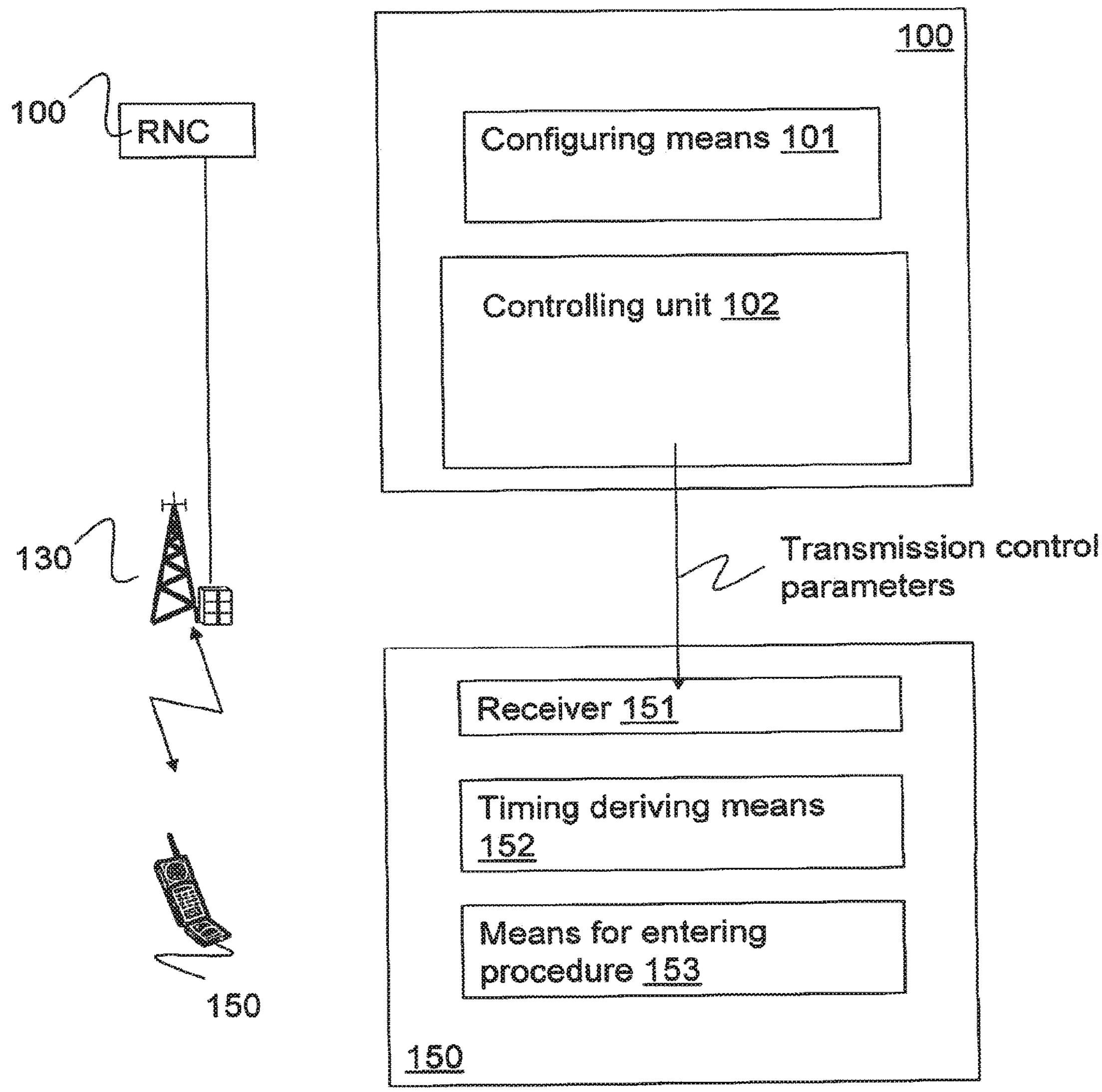
FIG. 5 illustrates schematically the RNC and UE according to embodiments of the present invention.

Schematically illustrated in FIG. 5 and according to the embodiments of the present invention, the RNC 100 comprises means for configuring 101 a first set of transmission control parameters associated with timing for a UE entering a RACH procedure, and means for configuring 101 a second set of transmission control parameters associated with timing for a UE entering an enhanced uplink in CELL_FACH state procedure. It also comprises a controlling unit 102 for controlling the timing for entering the transmission procedure for the UE depending on the type of transmission procedure. The controlling unit 102 is further configured to transmit at least the second set of transmission control parameters to the UE for controlling the timing.

Also illustrated in FIG. 5 is the UE 150. It comprises a receiver 151 for receiving at least a second set of transmission control parameters associated with timing for entering an enhanced uplink in CELL_FACH state procedure via layer 3 signalling. It also comprises means for deriving 152 the timing for entering the transmission procedure using the second set of transmission control parameters. This is done when initiating an enhanced uplink in CELL_FACH state procedure. The UE further comprises means for deriving 152 the timing for entering the transmission procedure using a first set of transmission control parameters associated with timing for entering a RACH procedure. This is done when initiating a RACH procedure. Finally, the UE comprises means for entering 153 the transmission procedure depending on the type of transmission procedure according to the derived timing.

It should be noted that the means illustrated in FIG. 5 may be implemented by physical or logical entities using software functioning in conjunction with a programmed microprocessor or general purpose computer, and/or using an application specific integrated circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A user equipment of a wireless communication network capable of entering a transmission procedure, wherein the type of transmission procedure is a random access procedure, the user equipment comprising:

a receiver operative to receive at least a first set of transmission control parameters associated with a timing for entering an enhanced uplink procedure when the user equipment is in CELL_FACH state, the first set of transmission control parameters including a first persistence value parameter and chosen to reduce a delay of access in comparison to an access time for access by the user equipment to ordinary uplink resources using a standard random access channel (RACH) procedure when the user equipment is not in CELL_FACH state, wherein the first persistence value parameter is different than a second persistence value parameter associated with a timing for the user equipment entering the standard random access channel; and a microprocessor configured to:

derive the timing for entering the transmission procedure using the first set of transmission control parameters including the first persistence value parameter, when initiating an enhanced uplink procedure when the user equipment is in CELL_FACH state, and enter the enhanced uplink transmission procedure according to the derived timing.

2. The user equipment of claim 1, wherein the receiver is operative to receive the set of transmission control parameters from within the communications network.

3. The user equipment of claim 2, wherein the receiver is operative to receive the set of transmission control parameters via layer 3 signalling.

4. The user equipment of claim 1, wherein the first persistence value parameter is higher than the second persistence value parameter.

5. The user equipment of claim 1, wherein the first set of transmission control parameters comprises only the first persistence value parameter.

6. The user equipment of claim 1, wherein one of the parameters of the first set of transmission control parameters is a back-off time parameter.

7. The user equipment of claim 6, wherein the back-off time parameter specifies a wait time period for performing a test to enter the enhanced uplink in CELL_FACH state procedure.

8. The user equipment of claim 7, wherein the back-off time parameter comprises a value of zero.

9. A method in a user equipment of a wireless communication network for entering a transmission procedure, wherein the type of transmission procedure is one of a random access channel (RACH) procedure and an enhanced uplink in CELL_FACH state procedure, the method comprising:

deriving a timing for entering a standard RACH procedure when the user equipment is not in CELL_FACH state using a first set of transmission control parameters, the first set of transmission control parameters including a first persistence value parameter;

deriving a timing for entering an enhanced uplink procedure when the user equipment is in CELL_FACH state using a second set of transmission control parameters, the second set of transmission control parameters including a second persistence value parameter that is different from the first persistence value parameter and chosen to reduce a delay of access in comparison to an access time for access by the user equipment to ordinary uplink resources using the standard random access channel procedure when the user equipment is not in CELL_FACH state; and entering the transmission procedure based on the type of transmission procedure and the derived timing.

10. The method of claim 9, further comprising receiving the second set of transmission control parameters from within the communications network.

11. The method of claim 10, further comprising receiving the second set of transmission control parameters via layer 3 signalling.

12. The method of claim 9, wherein the second persistence value parameter is higher than the first persistence value parameter.

13. The method of claim 12, wherein the second set of transmission control parameters comprises only the second persistence value parameter.

14. The method of claim 9, wherein one of the parameters of the second set of transmission control parameters is a back-off time parameter.

15. The method of claim 14, wherein the back-off time parameter specifies a wait time period for performing a test to enter the enhanced uplink in CELL_FACH state procedure.

16. The method of claim 15, wherein the back-off time parameter comprises a value of zero.

17. The method of claim 15, wherein the second set of transmission control parameters comprises only the back-off time parameter.

* * * * *